United States Patent
Sievers et al.

(10) Patent No.: US 8,374,236 B2
(45) Date of Patent: Feb. 12, 2013

(54) METHOD AND APPARATUS FOR IMPROVING THE AVERAGE IMAGE REFRESH RATE IN A COMPRESSED VIDEO BITSTREAM

(75) Inventors: John Sievers, Wakefield, MA (US);
Stephen Botzko, Reading, MA (US);
David Lindbergh, Reading, MA (US);
Charles M. Crisler, Windham, NH (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 13/452,325

(22) Filed: Apr. 20, 2012

(65) Prior Publication Data

US 2012/0200663 A1    Aug. 9, 2012

Related U.S. Application Data

(63) Continuation of application No. 10/798,519, filed on Mar. 11, 2004, now abandoned.

(51) Int. Cl.
*H04N 7/12* (2006.01)
(52) U.S. Cl. ................... 375/240.02; 348/14.13
(58) Field of Classification Search .............. None
See application file for complete search history.

(56) References Cited

U.S. PATENT DOCUMENTS

| | | | |
|---|---|---|---|
| 6,970,506 B2 * | 11/2005 | Kim et al. | 375/240.01 |
| 7,114,174 B1 * | 9/2006 | Brooks et al. | 725/105 |
| 2005/0041740 A1 * | 2/2005 | Sekiguchi et al. | 375/240.16 |

* cited by examiner

*Primary Examiner* — Christopher S Kelley
*Assistant Examiner* — Christopher Findley
(74) *Attorney, Agent, or Firm* — Wong, Cabello, Lutsch, Rutherford & Brucculeri, L.L.P.

(57) ABSTRACT

An apparatus and method for digital video encoding is disclosed. The disclosed system provides for a way of improving video quality for a given video coding system design.

7 Claims, 2 Drawing Sheets

METHOD AND APPARATUS FOR IMPROVING THE AVERAGE IMAGE REFRESH RATE IN A COMPRESSED VIDEO BITSTREAM

CROSS REFERENCE TO RELATED APPLICATIONS

This application is a continuation application of U.S. patent application Ser. No. 10/798,519 filed Mar. 11, 2004, which is incorporated by reference in its entirety, and to which priority is claimed.

BACKGROUND OF THE DISCLOSURE

1. Field of the Invention

The present invention relates generally to video coding and compression, and more particularly to providing a method of improving the frame rate or picture size of a compressed video sequence beyond that which a given decoder would otherwise be able to process.

2. Description of Related Art

Digitization of video has become increasingly important. Digitization of video in communication (e.g., videoconferencing) and for digital video recording has become increasingly common. In these applications, video is transmitted across telecommunication links such as telephone lines, computer networks, and radio, or stored on various media such as DVDs, hard disks, and SVCDs.

Presently, efficient transmission and/or storage of video data requires encoding and compression of video data. Video compression coding is a technique of processing and encoding digital video data such that less information (typically measured in bits) is required to represent a good-quality rendition of the video sequence. Most video compression/decompression systems are "lossy", which means that the reproduced video output is only an approximate, and not exact, version of the original input video data. Various compression/decompression schemes are used to compress video sequences.

Several approaches and standards for encoding and compressing source video signals exist. These include ITU-T Recommendations H.120, H.261, H.263, and H.264 (hereafter "H.120", "H.261", "H.262", "H.263" and "H.264", respectively), and standards promulgated by the International Organization for Standards/International Electrotechnical Commission ("ISO/IEC") "MPEG-1" (ISO/IEC 11172-2: 1993), "MPEG-2" (ISO/IEC 13818-2:2000/ITU-T Recommendation H.262), and "MPEG-4" (ISO/IEC 14496-2:2001). Each of these standards is incorporated by reference in its entirety.

In the most commonly used video compression systems, each uncompressed picture is represented by a rectangular array of pixels. In many operations, the whole image is not processed at one time, but is divided into rectangular groups of "macroblocks" (e.g., 16×16 pixels in each macroblock) that are individually processed. Each macroblock may represent either luminance or "luma" pixels or chrominance or "chroma" pixels, or some combination of both. A number of methods and techniques for macroblock-based processing of images are generally known to those skilled in the art, and thus are not repeated here in detail. All lossy video compression systems face a tradeoff between the fidelity of the of the decompressed video compared to the original and the number of bits used to represent the compressed video, all other factors being equal. For a given video sequence, different video quality may be produced by a video encoder for a fixed number of bits, if different compression techniques are used. Which techniques may be used, and their effectiveness, are in some cases dependent on the amount of computation, memory, and latency margin available to the compression system.

Existing methods of frame rate regulation allow an encoder to decrease (i.e., slow down) the frame rate to ensure that the image compression maintains an acceptable visual quality level, given other constraints such as computation, memory, and latency limits. Particularly, if enough of the image is changing, (meaning that a relatively larger number of bits will be required to maintain image quality), the encoder can slow down the frame rate to increase the available bits per frame. The prior art discloses a variety of existing methods that allow an encoder to run at a variable bitrate or variable frame rate. The prior art also discloses the idea of "skipping" coding for unchanged areas of the image. This technique has been used before for the purpose of reducing the bitrate of a video stream, or increasing the image quality (by increasing the bitrate of the coded areas to take advantage of the bits saved by not coding the unchanged areas).

The rate at which a video compression system (in both the encoder and decoder) can process frames is limited by a number of factors, such as the input frame rate, the bitrate of the compressed video stream, and the amount of computation the compression system can perform in a given period of time. Usually, in cases where there are ample input frames and available bitrate, the computation limit becomes the dominant limit on frame rate.

What is needed in the art is a technique that allows an encoder to increase (i.e., speed up) the frame rate dynamically based on a computational model of the decoder. Instead, ITU-T and MPEG compression systems define a fixed frame rate ceiling for a given picture size, which is based on the assumption that all macroblocks in each frame are coded. Another aspect of what is needed in the art is to further take advantage of the lowered decoding computation requirements when "skipping" is used, allowing the encoder to encode a faster frame rate than would otherwise be possible. The present invention is directed to such a system.

SUMMARY OF THE INVENTION

The present invention is directed to a technique in which a video encoder, using information either communicated from the decoder or from prior knowledge (for example from a published specification), determines a model of the decoder's computational load and adjusts its encoding dynamically in response thereto.

In many video compression systems the encoder must constrain the content of the encoded bitstream such that the decoding process will not exceed the capability of the decoder. For example, the computational capability and storage in a decoder limits the bitrate, frame rate, picture size, or combinations thereof that can be decoded in real-time. Appropriate bitstream constraints must be met when producing bitstreams for playback systems such as DVD players or video streaming media players, as well as real-time communication systems such as video conferencing systems (VCS). These bitstream constraints may be specified by providing the encoder with prior knowledge of the limitations of prospective decoders (for example from a published specification), or by the transmission of a set of one or more parameters from the decoder to the encoder, which directly or indirectly signal the decoder's capability.

One bitstream constraint is the maximum frame rate that can be decoded under a given set of circumstances. For example, in the ITU-T H.264 video codec specification, the maximum frame rate for a given picture size is computed from a parameter that specifies the maximum number of luminance macroblocks per second (each macroblock contains 256 pixels in H.264) that can be decoded (this parameter is called "MaxMBPS"). For example, if an H.264 decoder is known to support Level 1.2 of the Baseline profile, then it can receive frames containing up to 396 luminance macroblocks and can decode 6,000 luminance macroblocks per second (MaxMBPS has a value of 6,000). This indicates that if the decoder is receiving common intermediate format "CIF" frames (which contain 396 luminance macroblocks each), the maximum frame rate is 6,000÷396 or approximately 15 frames per second. If the decoder is receiving quarter common intermediate format "QCIF" frames (which contain 99 luminance macroblocks each), the maximum frame rate is 6,000÷99, or approximately 60 frames per second. In this example, the encoder is not permitted to encode more frames per second than the decoder can handle, e.g., 15 frames per second in the case of CIF.

Frequently, it is advantageous to encode a large picture size. For example, when sending a computer-based presentation in a video conference it is desirable to maintain the XGA (1024×768 pixels, which is 3072 luminance macroblocks in H.264) picture size of a typical computer screen. ITU-T Recommendation H.241, which is hereby incorporated by reference in its entirety, provides a method of signaling support for XGA video with H.264 Baseline Profile Level 1.2. However, the frame rate limit (as computed above) results in a very low frame rate at this picture size (approximately 1.95 frames per second). Often such computer presentations have large areas that do not change from frame to frame. Frequently the only motion will be the mouse cursor moving across the static picture on the screen. It would be a significant improvement to be able to increase the XGA frame rate in such situations so that the mouse cursor motion appears smooth on the far end.

There are other situations in which there is little motion in a scene where increasing the frame rate would result in more natural video. If the decoder can process unchanging areas of the picture more quickly than changing areas, then an encoder could in principle exploit this to encode a higher frame rate than might otherwise be possible.

The system disclosed herein exploits this possibility to maintain a higher frame rate, or encode better video quality without exceeding the peak computational capability of the decoder, and therefore permits a given compression system design to achieve better performance. Although the invention is described with reference to a video conferencing application, it is foreseen that the invention would also find beneficial application in other applications involving digitization of video data, e.g., the recording of DVDs, digital television, streaming video, video telephony, tele-medicine, tele-working, etc.

DETAILED DESCRIPTION OF THE INVENTION

For purposes of the following description and claims, these terms shall have the following meanings:

"bitstream"—A sequence of bits representing a video sequence. A bitstream can be stored or conveyed one bit at a time, or in groups of bits.

"coded macroblock"—A macroblock that is represented by coded bits which are to be decoded. Compare to "skipped macroblock".

"frame"—A single picture in a video sequence. Frames may or may not be interlaced (consisting of two or more "fields").

"image"—A single frame, same as a picture.

"macroblock"—A group of 1 or more pixels representing some particular area of a picture. In H.264 a macroblock is a group of 256 pixels in a 16×16 array, but in the context of this invention the pixels in a macroblock are not necessarily in a rectangular group, or even adjacent to one another.

"MB"—Abbreviation for macroblocks.

"picture size"—The number of pixels in each frame.

"quality"—The accuracy of the visual correspondence between the input and output of a coding/decoding process. Quality is improved by increasing frame rate, or by increasing picture size, or by increasing the fidelity of each individual decompressed frame compared to the original.

"rate"—The inverse of an interval. A phrase like "a maximum frame rate of 30 Hz" is equivalent to "a minimum inter-frame interval of 1/30 seconds." This use of "rate" does not imply that each successive frame must necessarily be separated by the same interval of time.

"skipped macroblock"—A macroblock for which no coded bits or substantially fewer than the normal number of bits are generated by the encoder. Usually this is because the skipped MB represents a portion of the picture that has not changed, or has changed little, from the preceding frame. Usually the amount of computation required to decode such a skipped macroblock is less than for a normal macroblock. Note that some encoders signal in some fashion (sometimes using bits) that the macroblock is skipped (H.263's Coded Macroblock Indication for instance).

"video sequence"—A sequence of frames.

Figure 1:
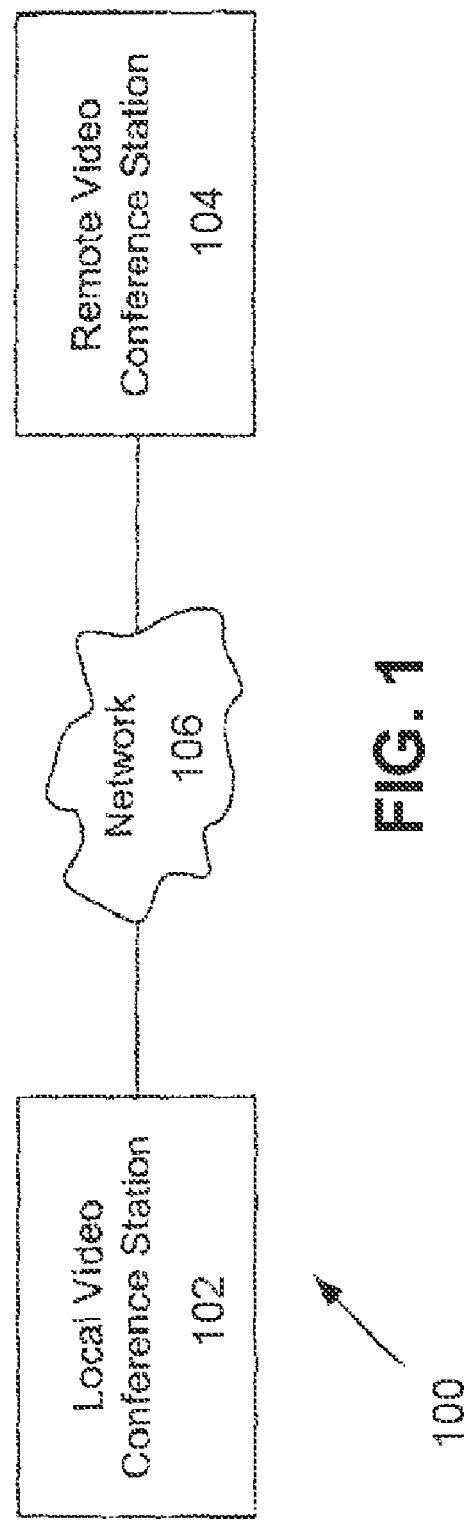
FIG. 1 is a block diagram of an exemplary video conferencing system.

FIG. 1 illustrates an exemplary video conferencing system 100. The video conferencing system 100 includes a local video conference station 102 and a remote video conference station 104 connected through a network 106. Although FIG. 1 only shows two video conference stations 102 and 104, those skilled in the art will recognize that more video conference stations may be coupled, directly or indirectly, to the video conferencing system 100. The network 106 may be any type of transmission medium including, but not limited to, POTS (Plain Old Telephone Service), cable, optical, and radio transmission media, or combinations thereof. Alternatively, any data storage and retrieval mechanism may be substituted for the network 106.

Figure 2:
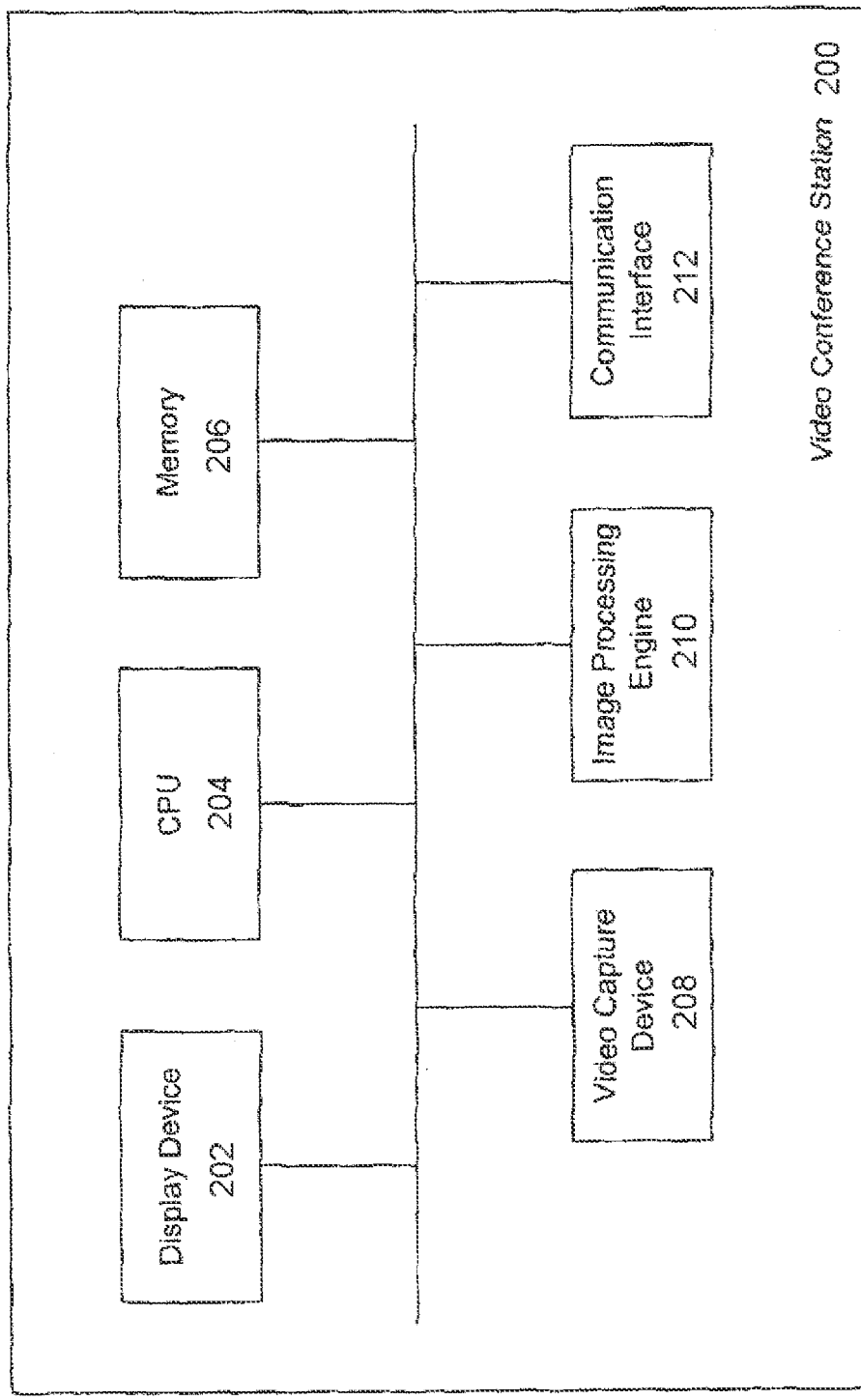
FIG. 2 is a block diagram of an exemplary video conference station of the video conferencing system of FIG. 1.

FIG. 2 is a block diagram of an exemplary video conference station 200. For simplicity, the video conference station 200 will be described as the local video conference station 102 (FIG. 1), although the remote video conference station 104 (FIG. 1) may contain a similar configuration. In one embodiment, the video conference station 200 includes one or more of the following: a display device 202, a CPU 204, a memory 206, a video capture device 208, an image processing engine 210, and a communication interface 212. Alternatively, other devices may be provided in the video conference station 200, or not all above named devices provided.

The video capture device 208 may be either a camera capturing natural scenes (of people, places, or any other things) or an input from any source of visual material (such as but not limited to a VCR or DVD player, a motion-picture projector, or the display output from a computer), and sends the images to the image processing engine 210. Certain functions of image processing engine 210 will be discussed in more detail below. Similarly, the image processing engine 210 may also transform received data from the remote video conference station 104 into a video signal for display on the display device 202, or for storage for later display, or for forwarding to other devices.

In a video compression system, if, for example, an area of the picture has not changed, or for other reasons, then the encoder (image processing engine 210) may elect to "skip" that area of the image. When this is done, the decoder outputs the same pixel data in the skipped area as was present in the previous frame (perhaps modified based on other factors such as picture areas that are not skipped, the history of object motion in the scene, error concealment techniques, etc.). Techniques to modify the output picture based on these other factors are known to those of ordinary skill in the art.

Because decoding usually requires very few computational resources for skipped areas of a picture, the decoder's computational capabilities are underutilized when picture areas are skipped. In fact, the decoder is usually capable of much higher maximum frame rates when significant areas of the image are skipped. For example, suppose a given decoder is capable of receiving 15 frames per second (fps) at CIF picture size when no macroblocks are skipped. If 75% of the macroblocks in each image were skipped, the decoder might be capable of receiving 30 fps. However, in the current art, there is no method for regulating frame rate that allows the encoder to exploit such a capability, and no technique for the encoder to be aware of such a dependency of the decoder's maximum frame rate on the proportion of skipped macroblocks, so the encoder must be limited to a 15 fps rate.

The system disclosed herein improves the average frame rate of a compressed video stream by taking advantage of the lowered decoding computational load when "skipping" is used. It comprises a method of specifying the decoder's processing capability and regulating the frame rate using this information. All other things being equal, the technique disclosed herein allows the encoder to encode a faster average frame rate than would otherwise be possible at a given picture size.

When choosing the tradeoff of picture size vs. frame rate, encoders generally take into account the frame rate the decoder can handle at a given picture size. The system disclosed herein allows the encoder to run at the normal picture size it would have selected, taking advantage of the higher average frame rate that skipping permits. Alternatively, the encoder can select a larger picture size than normally practical and maintain an acceptable frame rate, thereby improving the image quality. A combination of both benefits is also possible.

Described herein is an improved method of specifying the decoding system's computational capability, which is used together with the existing H.264 macroblocks per second limit MaxMBPS (or its equivalents in other video coding systems) to constrain the encoder bitstream in a new way described below. The preferred embodiment includes a parameter that allows the decoder's peak frame rate to be calculated by the encoder for whatever particular picture size and proportion of "skipped" macroblocks the encoder is encoding. In most decoder implementations, this peak frame rate is considerably higher than the frame rate limit that applies when the entire image is coded.

One such parameter that scales to different picture sizes is the number of macroblocks per second that can be processed by the decoder if all the macroblocks in the video sequence are skipped. We will call this parameter "MaxSKIPPED", which for the purposes of this explanation we will consider to be in units of macroblocks per second (MB/s). Note that if this MaxSKIPPED value is not constant for all supported picture sizes, then the minimum of these values may be used. MaxSKIPPED specifies a theoretical limit of the decoding system speed. It is theoretical because it is not useful in practice to encode a video sequence in which all macroblocks are skipped. The units of "macroblocks per second" is a good choice because the decoding system speed tends to slow down approximately linearly as picture size increases.

Other signaling could have been used instead of Max-SKIPPED. It would be equivalent to specify the maximum frame rate (in units of Hz for instance), or a minimum picture interval (in units of seconds for instance). Alternatively, a more complex set of parameters indicating MaxSKIPPED values for different picture sizes (for example a formula, complete set of values, or series of sample values for interpolation) may be used. However, MaxSKIPPED allows a single parameter to span a range of picture sizes, whereas maximum frame rate would have to be picture-size-specific. MaxSKIPPED also fits in well with the other signaling specified in H.264.

Like other decoder parameters, this MaxSKIPPED parameter can be conveyed to the encoder by the decoder (if the decoder has a communication path back to the encoder, e.g., many video-conferencing systems) or as prior knowledge given to the encoder (for example in a published specification), based on a given target type of decoder (if the decoder does not have a communication path back to the encoder, e.g., a DVD player).

Normally, the encoder determines the maximum frame rate (in frames per second) as:

$$MaxFrameRate = \frac{MaxMBPS}{PictureSize}$$

with PictureSize in units of macroblocks. Instead, in connection with the system described herein, the minimum frame interval is determined as:

$$MinFrameInterval = T_{coded} \times N_{coded} + T_{skipped} \times N_{skipped}$$

with:

$$MaxFrameRate = \frac{1}{MinFrameInterval}$$

which reduces to:

$$MaxFrameRate = \frac{1}{\frac{N_{coded}}{MaxMBPS} + \frac{N_{skipped}}{MaxSKIPPED}}$$

where MaxMBPS is the macroblock per second limit specified in H.264 Annex A or its equivalent; MaxSKIPPED is the maximum number of macroblocks per second the decoder can process if all macroblocks are skipped; $N_{coded}$ is the number of coded macroblocks in a picture; $N_{skipped}$ is the number of skipped macroblocks in a picture; $T_{coded}$ is the number of seconds to decode and output one coded macroblock (1÷MaxMBPS); and $T_{skipped}$ is the number of seconds to output (but not decode) one skipped macroblock (1÷MaxSKIPPED).

As an example, assume that the H.264 Level 1.2 decoder described above (which has a MaxMBPS of 6,000 MB/s) can alternatively process 24,000 skipped macroblocks per second (MaxSKIPPED is 24,000). Assume also that only 50% of the macroblocks are being encoded each second, as might be the case of a stationary camera framing one or two people are sitting at a table. The traditional encoder regulation method would limit the frame rate at the 396 macroblock per picture CIF picture size to about 15.2 frames per second (6,000÷396). The method described above allows the frame rate to be increased to 24.2 frames per second as long as 50% or more of the macroblocks are being skipped (1÷(198÷6,000+198÷24,000)). If the percentage of skipped blocks is increased to 75%, this method gives a maximum frame rate of 34.6 frames per second (1÷(99÷6,000)÷(297÷24,000)), which is far faster than the traditional encoding method.

As another example, assume that the H.264 Level 1.2 decoder is receiving SVGA video, which contains 1,875 macroblocks per frame (800×600 pixels), and that only the mouse cursor is moving. Assume further that encoding the mouse cursor region requires only 16 macroblocks. Traditional encoder regulation would limit the frame rate to 3.2 frames per second (6,000÷1,875). The method described above gives a frame rate of 12.5 frames per second (1÷(16÷6,000)+(1, 861÷6,000)). Of course, if the entire picture is changing and all macroblocks are coded (for example during a camera pan), the frame rate will drop off to the same value that the traditional method delivers.

The end result is a system that can be automatically regulated to run at the highest possible frame rate by allowing the encoder to dynamically determine the minimum frame interval that the decoder can computationally handle given the number of "skipped" macroblocks in the image stream. This minimum frame interval is used by the encoder as described below. When synchronous transmission systems are used, it is well known that the video bitrate must be matched to the synchronous transmission rate to ensure that the decoder receives an updated picture before that picture's display time. Since the number of bits in the picture is not always precisely known before the encoding process, in such cases system designs must account for some variation between the expected bits per compressed frame and the actual number of bits.

One well-known method of video bitrate matching operates on the principle that the encoder can account for an unexpectedly high number of bits per frame by encoding fewer frames per second (usually by not encoding one or more input frames) when this event occurs. In common practice, the encoder attempts to produce pictures that are precisely:

$$TargetPictureBits = ChannelCapacity \times \frac{PictureSize}{MaxMBPS}$$

where PictureSize is in macroblocks. The frame interval to the next encoded frame then is:

$$NextFrameInterval = \max\left(\frac{PictureSize}{MaxMBPS}, \frac{ActualPictureBits}{ChannelCapacity}\right)$$

This method of video bitrate matching ensures that the actual frame rate never exceeds the decoder's receive capability, and that the actual bitrate simultaneously never exceeds the channel capacity. When this method is employed in conjunction with the present invention, target picture bits is:

$$TargetPictureBits = \frac{ChannelCapacity}{ExpectedFrameRate}$$

The expected frame rate could simply be the average frame rate that the invention yields on this image source, or it could be adaptively determined depending on the amount of change in the image, the amount of motion in the scene, or other factors. The frame interval to the next encoded image frame then is:

$$NextFrameInterval = \max\left(\frac{N_{coded}}{MaxMBPS} + \frac{N_{skipped}}{MaxSKIPPED}, \frac{ActualPictureBits}{ChannelCapacity}\right)$$

This improved method ensures that the actual frame rate never exceeds the decoder's computational capability, and that the actual bitrate simultaneously never exceeds the channel capacity.

Another method of frame rate regulation is to include a buffering model as part of the decoder capabilities. This method allows for more variation in the bitrate for individual pictures than the first method, but also adds more delay to the decoding process. In this method, video bits are presumed to be received at a known rate. The decoder buffers these bits in a buffer of a known size, and empties the buffer as pictures are decoded. The picture decode time used in the buffering model may be the fixed frame rate limit averaged over some period of image transmission. The HRD (Hypothetical Reference Decoder) in the H.261 and H.263 standards, and the VBV (Video Buffering Verifier) described in ISO/IEC 13818-2 Annex C are examples of this method. Other buffering models can also be employed.

When this method of video bitrate matching is in use with the invention, for each newly encoded frame the permitted number of coded bits for that frame is limited to a range of values (i.e., to avoid overflow or underflow of the buffer). The target number of coded picture bits is computed as described above, but is constrained to fall within these limits. It is common practice to increase or decrease the target number of coded picture bits to maintain an average level of buffer fullness. The minimum frame interval described above is used in the encoder to calculate when bits are removed from the buffer by the decoder, e.g., to adjust the VBV buffer examination times described in ISO/IEC 13818-2 Annex C.9 through Annex C.12. Alternatively, the actual frame intervals may be used.

In an alternative buffering model, the encoder feeds its encoded bits into an encoder buffer for delivery to the actual channel. If the channel is synchronous (for instance ISDN), then the bits are drained from the buffer synchronously. Periodically groups of one or more video bits are removed from the buffer for transmission. If the channel is packet oriented, then the bits are drained using a traffic shaping algorithm that delivers the bits to the packet network at the media bitrate. The current fullness of the encoder buffer drives the bit-rate control algorithms used by the encoder.

Other equivalent methods of frame rate regulation could also be used. More complex models are possible, and could possibly further improve the results.

Ways of further improving the encoder's model of decoder computation requirements are possible. For example, in most video coding systems there are several types of macroblocks, each of which has its own decoding computational cost. Also, the number of transform coefficients that are included in each macroblock can have an effect on the computational load depending on the transform technology that is used. Another possibility is to separate the cost to decode symbols in the bitstream from the cost of decoding macroblocks, which requires the encoder to track the number of symbols in each compressed picture. Note that there are at least three basic entropy coding schemes for these symbols: arithmetic, fixed field, and variable length. Arithmetic has the highest computational cost, fixed field has the lowest. For all of these improved methods, information about the relative decoding computational burden would be given to the encoder, and analogous procedures performed.

Additionally, the system disclosed herein can be used to run at variable image picture size and a fixed frame rate, in contrast to the fixed picture size and variable frame rate mode described above. Many video compression algorithms (such as H.263 Annex P) have methods for adjusting the video picture size dynamically in the compressed bitstream. However, these methods are of limited utility since the frame rate is generally reduced dramatically as the picture size increases. With the present invention, the system can be configured to run at a fixed frame rate (for instance 30 fps) at a guaranteed minimum picture size (for instance CIF). During times when sufficient macroblocks per second are being skipped, this invention allows the picture size of the compressed images to be automatically increased while maintaining the fixed frame rate.

In the foregoing description, the H.264 video codec standard is used as an illustrative example. It should be noted, however, that the invention is generalizable and applicable to most video compression systems, including all modern video compression systems known to the inventors (H.261, H.263, H.264, Microsoft's WM9, MPEG-1, MPEG-2, MPEG-4, etc.).

The invention has been explained with reference to exemplary embodiments. It will be evident to those skilled in the art that various modifications may be made thereto without departing from the broader spirit and scope of the invention. Further, although the invention has been described in the context of its implementation in particular environments and for particular applications, those skilled in the art will recognize that the present invention's usefulness is not limited thereto and that the invention can be beneficially utilized in any number of environments and implementations. The foregoing description and drawings are, accordingly, to be regarded in an illustrative rather than a restrictive sense.

What is claimed is:

1. A method of video coding a video sequence, wherein the video sequence comprises information representing a sequence of encoded frames, each encoded frame comprising one of more encoded macroblocks, the method comprising:
    determining one or more processing capabilities of a decoder that will decode the transmitted and digitally-encoded video sequence;
    encoding macroblocks of a first image;
    encoding macroblocks of subsequent images, wherein some macroblocks are skipped by the encoding process; and
    determining a fraction of macroblocks that are skipped; characterized by
    determining a maximum frame rate (MaxFrameRate) as a function of the fraction of macroblocks that are skipped and of the one or more processing capabilities of the decoder in accordance with the following expression:

$$MaxFrameRate = \frac{1}{\frac{N_{coded}}{MaxMBPS} + \frac{N_{skipped}}{MaxSKIPPED}}$$

wherein $N_{coded}$ is the number of coded macroblocks, $N_{skipped}$ is the number of skipped macroblocks, MaxMBPS is the maximum of macroblocks that can be decoded in a given interval, and MaxSKIPPED is the maximum number of macroblocks that can be decoded by the decoder in a given interval if all macroblocks are skipped and which is determined in the processing capability determining step; and
    increasing a video frame rate in dependency of the maximum frame rate.

2. The method of claim 1 wherein the step of determining one or more processing capabilities of the decoder comprises having prior knowledge of the decoder type.

3. The method of claim 1 wherein the step of determining one or more processing capabilities of the decoder comprises receiving processing capability information from the decoder.

4. The method of claim 1 comprising increasing a video picture size or the video frame rate and the video picture size in dependency of the fraction of macroblocks that are skipped and the of the one or more processing capabilities of the decoder.

5. The method of claim 1 wherein a video frame rate or a video picture size is further determined as a function of a computational cost of the decoder to decode various types of macroblocks.

6. A video conferencing terminal (200) adapted to produce encoded video including a sequence of encoded frames, each encoded frame comprising one or more encoded macroblocks, the video conferencing terminal comprising:
    One or more image processing engines (210) adapted to encode a video signal, where some macroblocks are skipped during processing by the one or more processing engines; and
    a communication interface (212) adapted to determine one or more processing capabilities of a decoder that will decode the encoded video,
    characterized by
    the one or more image processing engines (210) are adapted to:
        determine the processing capability of the decoder as a function the number of macroblocks (MaxSKIPPED) that can de decoded in a given interval if all macroblocks are skipped;
        determine a maximum frame rate (MaxFrameRate) as a function of macroblocks that are skipped and the one or more processing capabilities of the decoder in accordance with the following expression:

$$MaxFrameRate = \frac{1}{\frac{N_{coded}}{MaxMBPS} + \frac{N_{skipped}}{MaxSKIPPED}}$$

wherein $N_{coded}$ is the number of coded macroblocks, $N_{skipped}$ is the number of skipped macroblocks, and MaxMBPS is the maximum number of macroblocks that can be decoded in a given interval; and increase a frame rate in dependency of the maximum frame rate.

7. The video conferencing terminal of claim 6 wherein the frame rate or the picture size is further determined as a function of a computational cost of the decoder to decode various types of macroblocks.

* * * * *